United States Patent [19]

Homer et al.

[11] 3,836,838

[45] Sept. 17, 1974

[54] HIGH VOLTAGE POWER SUPPLY

[75] Inventors: John C. Homer, Willoughby; John R. Stock, Fairview, both of Ohio

[73] Assignee: Stock Equipment Company, Cleveland, Ohio

[22] Filed: Dec. 4, 1972

[21] Appl. No.: 311,859

Related U.S. Application Data

[62] Division of Ser. No. 140,519, May 5, 1971, Pat. No. 3,763,380.

[52] U.S. Cl.................... 323/7, 307/237, 307/318, 321/10 R, 317/9 R, 323/22 Z
[51] Int. Cl.............................................. G05f 3/14
[58] Field of Search....... 321/9 R, 10; 323/17, 22 Z, 323/7, 8; 307/237, 318; 317/9 R

[56] References Cited
UNITED STATES PATENTS 2,915,648  12/1959  Chudleigh, Jr. et al. ........ 307/318 X
3,063,001  11/1962  White ............................. 323/17 X
3,229,185  1/1966   Nye, Jr........................... 323/22 Z X
3,250,919  5/1966   Maass ............................. 307/318 X
3,395,317  7/1968   Hanson ........................... 321/10 X

*Primary Examiner*—Gerald Goldberg
*Attorney, Agent, or Firm*—Bosworth, Sessions, & McCoy

[57] ABSTRACT

A high voltage power supply having a clamping zener diode in series between a regulating zener diode and an output filter capacitor to clamp the capacitor to the peak voltage across the regulating zener diode. A bleeder resistor across the regulating zener diode provides a discharge path for the output capacitor through the zener impedance of the clamping zener diode when the supply is turned off.

2 Claims, 5 Drawing Figures

PATENTED SEP 17 1974 3,836,838
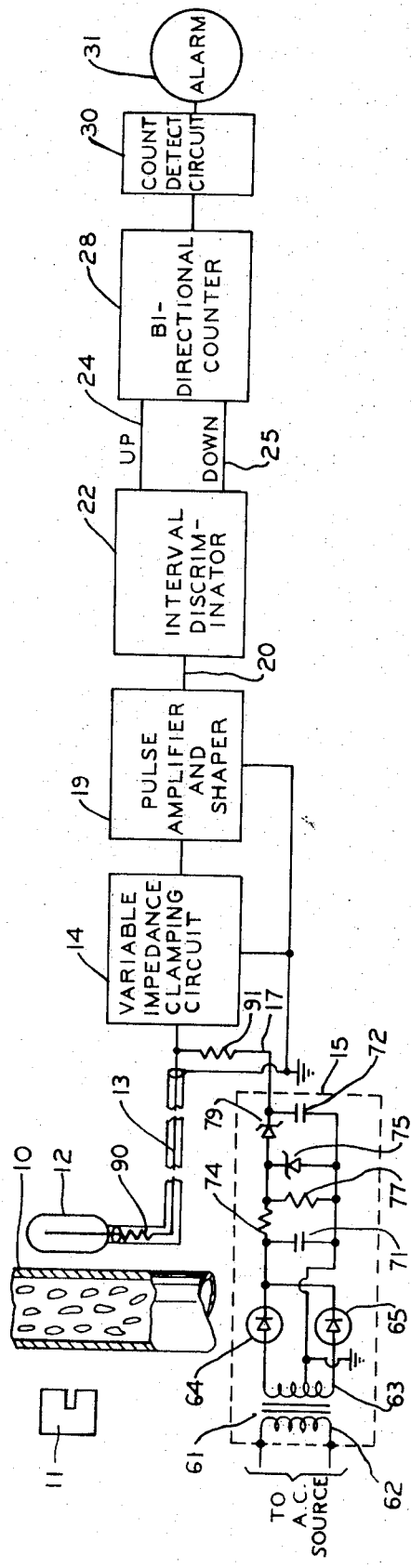

HIGH VOLTAGE POWER SUPPLY

This is a division, of application Ser. No. 140,519, filed May 5, 1971.

BACKGROUND OF THE INVENTION

Parent application Ser. No. 140,519, now U.S. Pat. No. 3,763,380, discloses and claims a method and apparatus for measuring the amount of material in a conduit, such as the presence or absence of coal in a conduit through which the coal flows, and the actuation of an alarm or control if the amount of material in the conduit goes below a predetermined minimum. The invention of that application includes improvements in method and apparatus for discriminating between rates of pulses that occur randomly in time, such as pulses derived from emissions by radioactive materials, which may be used in conjunction with an alarm or control system of the type mentioned above. The present invention includes the provision of a novel high voltage power supply such as for Geiger tubes and the like which may be used advantageously in the measuring apparatus mentioned above.

SUMMARY OF THE INVENTION

An object of the present invention is the provision of a high voltage D.C. power supply that is more compact and less expensive than prior such supplies, and that includes a novel filter arrangement for reducing A.C. components in the output voltage without the use of capacitors of very large values and large size.

Preferably, a high voltage D.C. power supply according to this invention includes means for providing a rectified alternating voltage, means for regulating the rectified voltage and means for filtering the regulated and rectified voltage. The filtering means includes an output filter capacitor, a zener diode connected between the regulating means and the output capacitor to clamp the capacitor to the peak voltage across the regulator means and thereby increase the filtering effect of the output capacitor. A bleeder resistor is connected to provide a discharge path for the output capacitor through the zener impedance of the zener diode when the power supply is turned off.

BRIEF DESCRIPTION OF THE DRAWING

The Drawing is a combined block and schematic diagram illustrating apparatus embodying the power supply of the present invention particularly as employed in to a coal flow alarm.

DESCRIPTION OF THE PREFERRED EMBODIMENT

The invention is disclosed herein as employed in to a coal flow alarm that gives an indication and, if desired, actuates controls if there is a substantial reduction in the amount of coal in a conduit through which coal is flowing downwardly.

As shown in the drawing, the coal flow alarm is associated with a conduit 10 that is normally full of coal moving downwardly, ultimately to be supplied to a furnace. An appropriately shielded radiation source 11 is disposed on one side of the conduit. On the other side of the conduit, there is a radiation detector in the form of Geiger tube 12. Radiation pulses passing through conduit 10 are detected by the Geiger tube and are transmitted in the form of electrical pulses through cable 13, which varies in length according to the particular installation, to a variable impedance clamping circuit 14. Geiger tube 12 is energized from a high voltage D.C. power supply 15 according to the present invention that is connected to cable 13 through a cable 17 adjacent to the connection of cable 13 to variable impedance clamping circuit 14.

Variable impedance clamping circuit 14 embodies a circuit that presents a variable impedance to incoming pulses according to their amplitude. The pulse amplifier and shaper 19 receives the pulses from variable impedance clamping circuit 14 and amplifies and shapes them to a constant height. Pulses from pulse amplifier and shaper 19 are transmitted through line 20 to an interval discriminator 22 which produces up pulses on line 24 or down pulses on line 25 according to whether the incoming pulses follow the preceding pulse in line 20 by an interval less than or greater than a predetermined interval. Up pulses in line 24 and down pulses in line 25 are transmitted to a bidirectional counter 28 where up pulses are caused to increment the counter and down pulses are caused to decrement the counter.

So long as a proper amount of coal is flowing in conduit 10 the number of up pulses will be less than the number of down pulses and the bidirectional counter 28 will tend to remain within a relatively few counts from the bottom of its count range. If there is insufficient coal in the conduit 10, more radiation pulses will be transmitted therethrough and the end result will be that more up pulses will be developed and cause bidirectional counter 28 to count up to a predetermined count which will be detected by count detect circuit 30 and an alarm 31 actuated to indicate that there is insufficient coal in the conduit 10.

As long as there is insufficient coal in conduit 10 up pulses will continue to be produced and bidirectional counter 28 will be maintained near the top of its count range. As more coal is supplied to conduit 10 to correct the insufficiency thereof less radiation is transmitted through conduit 10 and detected by Geiger tube 12 with the result that fewer up pulses and more down pulses are produced. The down pulses cause bidirectional counter 28 to count down and to be restored to its normal counting range.

The operation described above along with method and apparatus for carrying it out is described fully in Homer and Stock U.S. Pat. No. 3,551,672 and improvements in the method and apparatus are described fully in parent Application Ser. No. 140,519, now U.S. Pat. No. 3,763,380.

The present invention resides in the provision of an improved high voltage D.C. power supply 15 which, as illustrated here, is used to supply high voltage to Geiger tube 12. This improved power supply includes a transformer 61 having its primary winding 62 connected to a source of alternating voltage (not shown) and its secondary winding 63 connected to a full wave rectifier in the form of diodes 64 and 65. Secondary winding 63 is provided with a center tap that is grounded.

The unfiltered full wave rectified power supply so far described is completely conventional and is not, per se, a part of the improvement of this invention. The basic unfiltered power supply shown may be replaced by, for example, a half wave rectified supply or a voltage doubler type supply or any other suitable basic power supply.

The improved high voltage D.C. power supply includes a filter circuit comprising filter capacitors 71 and 72, a regulating circuit including current limiting resistor 74 and zener diode 75, bleeder resistor 77, and a clamping zener diode 79. In a conventional high voltage D.C. power supply bleeder resistor 77 would be connected directly across the output filter capacitor 72 to discharge that capacitor when the supply is turned off and clamping zener diode 79 would not be present.

In the power supply 15 the output voltage is regulated by zener diode 75 and current limiting resistor 74, and the voltage is filtered by capacitors 71 and 72 along with zener diode 79. The voltage across zener diode 75 has a significant A.C. voltage component of "ripple" or noise superimposed upon it due to the zener impedance of zener diode 75. Output filter capacitor 72 is charged to the peak value of the voltage across regulating zener diode 75 through zener diode 79 which clamps capacitor 72 to that value. The power supply thus provides a well regulated filtered output voltage on line 17 which is connected to cable 13 that leads to Geiger tube 12.

When power supply 15 is turned off output capacitor 72 will be charged to the peak output voltage of the supply and, because of the high voltage involved, must be discharged to prevent hazardous shocks to personnel. Since diode 79 is a zener diode, capacitor 72 can discharge through its zener impedance and through bleeder resistor 77. The zener voltage of zener diode 79 can be quite low compared to the zener voltage of regulating zener diode 75 and need only be higher than the peak-to-peak value of the A.C. component of voltage across zener diode 75 when the power supply is in operation. When the power supply is turned off output capacitor 72 will thus discharge to the zener level of zener diode 79. Since this zener level is quite low the residual voltage across capacitor 72 is not sufficient to cause harm and will eventually leak off.

It has previously been proposed to use a conventional diode in the position of the zener diode 79 in low voltage power supplies, which do not require a bleeder resistor. Since it is necessary with a high voltage supply to discharge output filter capacitor 72, it is necessary, if zener diode 79 is to be replaced by a conventional diode, to connect bleeder resistor 77 directly across capacitor 72. In that case, however, bleeder resistor 77 detracts from the filtering effect of the diode and capacitor 72. The filtering circuit in power supply 15 thus accomplishes filtering in a very efficient manner while still allowing output capacitor 72 to be discharged through a bleeder resistor to a safe voltage level when the power supply is turned off.

A particular advantage of this power supply is that it can be made relatively inexpensively and in a compact package. This is so because filter capacitors 71 and 72 can be relatively small in capacitance value and, therefore, in physical size and cost because of the filtering effect provided by zener diode 79. In a particular example of a high voltage D.C. power supply constructed in accordance with this invention and designed to produce a 600 volt output voltage, filter capacitors 71 and 72 are each 0.1 microfarads. Current limiting resistors 74 has a value of 120,000 ohms and bleeder resistor 77 has a value of 44 Megohms. Regulating zener diode 75 includes three zener diodes type 1R200A manufactured by Solitron Corporation, each diode having a zener voltage of 200 volts, and zener diode 79 is a type 1N751A and has a zener breakdown voltage of 5 volts.

While a preferred form of this invention has been specifically disclosed and described herein it will be apparent to those skilled in the art that various modifications may be made without departing from the scope of this invention. Accordingly, the invention is not to be limited to the form herein specifically disclosed nor in any other way inconsistent with the advance in the art promoted by this invention.

What is claimed is:

1. A high voltage D.C. power supply comprising means for providing an alternating input voltage of predetermined amplitude, means for rectifying said alternating input voltage, means for regulating said rectified voltage, and means for filtering said regulated and rectified voltage, said filtering means including an output filter capacitor, a zener diode connected between said regulator means and said output capacitor and adapted to clamp said output capacitor to the peak voltage across said regulator means and thereby to increase the filtering effect of said capacitor, and a bleeder resistor connected to provide a discharge path for said capacitor only through the zener impedance of said clamping zener diode when said alternating input voltage is interrupted, whereby said clamping zener diode allows said bleeder resistor to be positioned to provide a discharge path for said output capacitor and so that said bleeder resistor does not substantially reduce the filtering effect of said clamping zener diode and said output capacitor.

2. A power supply as claimed in claim 1 wherein said regulator means includes a regulating zener diode, said bleeder resistor being connected across said regulating zener diode, and said clamping zener diode being connected in series between said regulating zener diode and bleeder resistor and said output capacitor and having a zener breakdown voltage greater than the peak-to-peak value of the A.C. component of voltage across said regulating zener diode.

* * * * *

UNITED STATES PATENT OFFICE
CERTIFICATE OF CORRECTION

Patent No. 3,836,838                    Dated September 17, 1974

Inventor(s) John C. Homer, III and John R. Stock

It is certified that error appears in the above-identified patent and that said Letters Patent are hereby corrected as shown below:

[75] first line, correct "John C. Homer" to read

--John C. Homer, III--.

[75] second line, correct "Fairview" to read

--Fairview Park--.

Column 1, line 50 delete "to".

Column 1, line 54 delete "to".

Signed and sealed this 19th day of November 1974.

(SEAL)
Attest:

McCOY M. GIBSON JR.                    C. MARSHALL DANN
Attesting Officer                      Commissioner of Patents